United States Patent
Mochizuki et al.

(10) Patent No.: US 9,440,191 B2
(45) Date of Patent: Sep. 13, 2016

(54) ACIDIC GAS SEPARATION MODULE, AND METHOD FOR MANUFACTURING ACIDIC GAS SEPARATION MODULE

(71) Applicant: FUJIFILM CORPORATION, Minato-ku, Tokyo (JP)

(72) Inventors: Yusuke Mochizuki, Kanagawa (JP); Yoichi Hosoya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/624,584

(22) Filed: Feb. 18, 2015

(65) Prior Publication Data
US 2015/0157980 A1    Jun. 11, 2015

Related U.S. Application Data

(63) Continuation of application No. PCT/JP2013/073710, filed on Sep. 3, 2013.

(30) Foreign Application Priority Data

Sep. 28, 2012 (JP) ................................ 2012-218166

(51) Int. Cl.
*B01D 53/02* (2006.01)
*B01D 53/81* (2006.01)
(Continued)

(52) U.S. Cl.
CPC ............. *B01D 53/81* (2013.01); *B01D 53/228* (2013.01); *B01D 53/62* (2013.01); *B01D 63/10* (2013.01);
(Continued)

(58) Field of Classification Search
CPC .................... B01D 2053/223; B01D 2251/30; B01D 2253/202; B01D 2257/504; B01D 2313/143; B01D 53/228; B01D 53/62; B01D 53/81; B01D 63/10; B32B 2305/026; B32B 2307/724; B32B 38/0012; Y02B 10/10
See application file for complete search history.

(56) References Cited

U.S. PATENT DOCUMENTS 3,878,054 A * 4/1975 Rodgers ................... B01D 1/10
159/DIG. 27
4,033,878 A * 7/1977 Foreman ................ B01D 61/28
210/321.74
(Continued)

FOREIGN PATENT DOCUMENTS

JP        H02-32929 U      3/1990
JP        H07-102310 B2    11/1995
(Continued)

OTHER PUBLICATIONS

Written Opinion of the ISA issued in International Application No. PCT/JP2013/073710 on Nov. 12, 2013.
(Continued)

*Primary Examiner* — Christopher P Jones
(74) *Attorney, Agent, or Firm* — Solaris Intellectual Property Group, PLLC

(57) ABSTRACT

An acidic gas separation module including: a perforated hollow central tube; and a layered body that is wound on the perforated hollow central tube and has, in the following order on a porous support: an acidic gas separation layer containing a water-absorbing polymer, a carrier, and water; and a flow channel material with a network structure having a thread intersection portion and an arithmetical surface roughness for a surface contacting the acidic gas separation layer in the thread intersection portion of 35 μm or less. The acidic gas separation module suppresses generation of flocculated water by maintaining the generation of turbulent flow in the flow channel material, effectively suppresses damage to the surface of the acidic gas separation layer by the flow channel material in the winding-on process during manufacture, and exhibits excellent acidic gas separation efficiency.

20 Claims, 3 Drawing Sheets

(51) Int. Cl.
*B01D 63/10* (2006.01)
*B01D 53/22* (2006.01)
*B01D 53/62* (2006.01)
*B32B 38/00* (2006.01)

(52) U.S. Cl.
CPC ..... *B32B 38/0012* (2013.01); *B01D 2053/223* (2013.01); *B01D 2251/30* (2013.01); *B01D 2253/202* (2013.01); *B01D 2257/504* (2013.01); *B01D 2313/143* (2013.01); *B32B 2305/026* (2013.01); *B32B 2307/724* (2013.01); *Y02C 10/10* (2013.01)

(56) References Cited

U.S. PATENT DOCUMENTS

| | | | | |
|---|---|---|---|---|
| 5,034,126 A * | 7/1991 | Reddy | .................... | B01D 53/22 210/321.74 |
| 7,341,663 B2 * | 3/2008 | Offeman | .............. | B01D 61/246 210/321.6 |
| 7,615,105 B2 * | 11/2009 | Odaka | .................... | B01D 69/10 210/321.83 |
| 8,661,648 B2 * | 3/2014 | Jons | ....................... | B01D 63/10 210/321.72 |
| 8,673,148 B2 * | 3/2014 | Straeffer | .............. | B01D 63/103 210/321.83 |
| 8,968,566 B2 * | 3/2015 | Beauchamp | ........... | B01D 63/10 210/321.74 |
| 2011/0223650 A1 * | 9/2011 | Saunders | ........... | B01D 53/1475 435/266 |
| 2012/0219756 A1 | 8/2012 | Yoshida et al. | | |
| 2013/0287986 A1 * | 10/2013 | Yamamuro | ............ | B01D 53/62 428/40.1 |
| 2015/0151244 A1 * | 6/2015 | Ishizuka | ................ | B01D 53/22 422/212 |

FOREIGN PATENT DOCUMENTS

| | | |
|---|---|---|
| JP | 2007-117949 A | 5/2007 |
| JP | 2010-131483 A | 6/2010 |
| WO | 2009001882 A1 | 12/2008 |
| WO | 2011/049231 | 4/2011 |
| WO | 2012096055 A1 | 7/2012 |

OTHER PUBLICATIONS

International Search Report issued in International Application No. PCT/JP2013/073710 on Nov. 12, 2013.

Partial English language translation of the following: Office action dated Aug. 4, 2015, from the JPO in a Japanese patent application corresponding to the instant patent application. This office action translation is submitted now in order to supplement the understanding of the cited reference which is being disclosed in the instant Information Disclosure Statement.

* cited by examiner

ACIDIC GAS SEPARATION MODULE, AND METHOD FOR MANUFACTURING ACIDIC GAS SEPARATION MODULE

CROSS-REFERENCE TO RELATED APPLICATION

This application is a Continuation of PCT International Application No. PCT/JP2013/073710, filed Sep. 3, 2013, which claims priority under 35 U.S.C. §119(a) to Japanese Patent Application No. 2012-218166 filed Sep. 28, 2012. Each of the above applications is hereby expressly incorporated by reference, in its entirety, into the present application.

BACKGROUND OF THE INVENTION

1. Technical Field

The present invention relates to an acid gas separation module and a method for manufacturing an acid gas separation module.

2. Background Art

In recent years, development of techniques for selectively separating carbon dioxide from a mixed gas is advancing. For example, as a countermeasure for global warming, a technique of collecting carbon dioxide in exhausted gas and condensing it, and a technique of forming a complex for carbon dioxide separation, which is used for obtaining gas for fuel cells or the like, the gas including hydrogen as a main component, by reforming a hydrocarbon into hydrogen and carbon monoxide (CO) by steam reforming, further allowing the carbon monoxide to react with steam to form carbon dioxide and hydrogen, and excluding the carbon dioxide by using a membrane which is selectively permeable by carbon dioxide, have been developed. Further, various techniques of separating acidic gases such as toxic hydrogen sulfide, have also been developed. In an example of an acidic gas separation module having carbon dioxide separation ability, a carbon dioxide separation module, which is densely filled with a carbon dioxide complex in order to process a larger amount of gas using a small volume, is equipped with a complex for carbon dioxide separation including a support which serves as a flow channel material that is permeable by gas, a carbon dioxide separation layer containing a carbon dioxide carrier, and a porous membrane having gas permeability, and using the carbon dioxide separation module, carbon dioxide in the gas is separated by the function of the carbon dioxide separation layer, and removed, while the gas passes through the voids of the support.

In general, in order to efficiently perform separation of acidic gas by using a complex for acidic gas separation, plural layers of a complex for acidic gas separation are disposed one on another in layers and used. Specifically, a cylindrical spiral-wound module for acidic gas separation produced by winding, on a perforated hollow central tube, a layered body including a complex for acidic gas separation and a flow channel material is used.

For example, a method for manufacturing a carbon dioxide separation gel membrane, in which an aqueous solution of an non-crosslinked vinyl alcohol-acrylic acid salt copolymer is coated on a carbon dioxide permeable support so as to form a film, followed by crosslinking by heating, to obtain a water insoluble substance, and then this water insoluble substance is impregnated with an aqueous solution of a carbon dioxide carrier and gelated, has been disclosed (for example, see Japanese Patent Application Publication (JP-B) No. H7-102310).

In a separation membrane module, a flow channel material having a network structure is disposed adjacent to an acidic gas separation layer, in order to provide flow paths for the acidic gas and the gas to be processed. When pressure loss occurs in the flow channel material, separation efficiency lowers, and therefore, a technique of setting different values for the thread diameters of warp and weft, in the threads that form the network structure, and a technique of thinning the thread diameter only at the intersection portion, have been proposed (see, for example, Japanese Patent Application Laid-Open (JP-A) Nos. 2007-117949 and 2010-131483).

SUMMARY OF INVENTION

Technical Problem

In JP-B No. H7-102310 noted above, a carbon dioxide separation gel membrane having a small area (for example, an effective area of 9.62 $cm^2$) can be formed; however, it is difficult to stably form a carbon dioxide separation gel membrane having a substantially uniform film thickness, on a carbon dioxide permeable support having a large area. Further, since the strength of the gel membrane is insufficient, in forming a spiral-wound module by disposing the gel membrane and a flow channel material one on another in layers and winding the resulting layered body on a central tube, there are concerns that the carbon dioxide separation gel membrane may be damaged due to the surface roughness of the flow channel material, which may cause reduced productivity.

In the flow channel material, in order to ensure sufficient gas permeation properties, a flow channel material having a network structure is used; however, since the thickness of the flow channel material depends on the thickness of the thread intersection portion in the network structure, there is a tendency for the thickness to become greater with respect to the voids formed by the flow channel material. In the case of forming a spiral-wound module, there are restrictions on the volume of the module (the volume of the container into which the module is to be mounted) based on the installation location or the like, and therefore, when the thickness of the flow channel material is high, the film thickness of the acidic gas separation layer should be relatively reduced, which is not preferable in terms of separation efficiency. Meanwhile, in JP-A Nos. 2007-117949 and 2010-131483 noted above, complicated processes are needed to produce a flow channel material for reducing pressure loss, and in addition, although a technique aimed at improving the planarity of the whole flow channel material having a network structure is described, the technique is not a technique that focuses on the thread intersection portion. Here, in the thread intersection portion, there are concerns that voids may be generated between the acidic gas separation layer and the flow channel material. In a case in which such voids are generated, the voids may serve as a path for gas and, as a result, generation of turbulent flow of gas in the flow channel material is suppressed, and the effect of suppression of concentration polarization of the processed gas due to the turbulent flow is diminished, thereby causing condensation of moisture. When the condensed moisture contacts the acidic gas separation layer, undesired elution of a carrier may be caused, and the acidic gas separation efficiency may be lowered.

The invention has been made in view of such circumstances and aims to accomplish the following. Namely, an aspect of the invention is to provide a spiral-wound module for acidic gas separation, in which reduction of the permeation speed of a permeable gas due to occurrence of concentration polarization and generation of condensed water are suppressed, by maintaining the generation of turbulent flow in the flow channel material, and damage to the surface of the acidic gas separation layer by the flow channel material in the winding-on process during manufacture is effectively suppressed, and which exhibits excellent acidic gas separation efficiency. Another aspect of the invention is to provide a method for manufacturing an acidic gas separation module, with which an acidic gas separation module exhibiting excellent acidic gas separation efficiency can be manufactured with high productivity.

Solution to Problem

Means for solving the above problems are as follows.

<1> An acidic gas separation module including: a perforated hollow central tube; and a layered body that is wound on the perforated hollow central tube and has, in the following order on a porous support: an acidic gas separation layer containing a water-absorbing polymer, a carrier, and water; and a flow channel material with a network structure having a thread intersection portion and an arithmetical surface roughness for a surface contacting the acidic gas separation layer in the thread intersection portion of 35 µm or less.

<2> The acidic gas separation module according to the item <1>, satisfying a relationship shown in the following Formula (1):

$$b < 2a \qquad \text{Formula (1)}$$

wherein, in Formula (1), "a" represents a mean diameter of a thread in a region other than the thread intersection portion in the flow channel material, and "b" represents a layer film thickness of the flow channel material.

<3> The acidic gas separation module according to the item <1> or the item <2>, wherein a void area formed by the network structure of the flow channel material is in a range of from 0.5 mm² to 20 mm².

<4> The acidic gas separation module according to any one of the items <1> to <3>, wherein, in the network structure of the flow channel material, the sum of angles formed by a direction of flow of the acidic gas to be separated and threads, with the thread intersection portion as a reference point, is 85° or more.

<5> The acidic gas separation module according to any one of the items <1> to <4>, wherein the network structure of the flow channel material is formed with a thread including at least one resin selected from the group consisting of polyester, polypropylene, polyamide, polyphenylene sulfide, polytetrafluoroethylene, polyether ether ketone, polyether sulfone, polysulfone, polyvinylidene fluoride, polycarbonate and polyvinylidene chloride.

<6> The acidic gas separation module according to any one of the items <1> to <5>, wherein the carrier is at least one carbon dioxide carrier selected from the group consisting of cesium carbonate, cesium hydrogencarbonate, cesium hydroxide, rubidium carbonate, rubidium hydrogencarbonate and rubidium hydroxide.

<7> The acidic gas separation module according to any one of the items <1> to <6>, wherein a material for the porous support is at least one resin material selected from the group consisting of polyethylene, polystyrene, polyethylene terephthalate, polytetrafluoroethylene, polyether sulfone, polyphenylene sulfide, polysulfone, polypropylene, polyether imide, polyether ether ketone and polyvinylidene fluoride.

<8> The acidic gas separation module according to any one of the items <1> to <7>, wherein the water-absorbing polymer is at least one selected from the group consisting of a polyvinyl alcohol-polyacrylic acid copolymer, polyvinyl alcohol, polyacrylic acid, polyacrylic acid salts, polyvinyl butyral, poly-N-vinyl pyrrolidone, poly-N-vinyl acetamide and polyacrylamide.

<9> The acidic gas separation module according to any one of the items <1> to <8>, wherein the acidic gas separation layer further includes a thickening polysaccharide.

<10> The acidic gas separation module according to any one of the items <1> to <9>, wherein the water-absorbing polymer includes a crosslinked structure based on a crosslinking agent.

<11> The acidic gas separation module according to the item <10>, wherein the crosslinking agent is at least one selected from the group consisting of a polyvalent glycidyl ether, a polyhydric alcohol, a polyvalent isocyanate, a polyvalent aziridine, a haloepoxy compound, a polyvalent aldehyde and a polyvalent amine.

<12> The acidic gas separation module according to any one of the items <1> to <11>, wherein the acidic gas separation layer further includes at least one carbon dioxide absorption accelerator selected from the group consisting of nitrogen-containing compounds and sulfur compounds.

<13> A method for manufacturing an acidic gas separation module, the method including: forming an acidic gas separation complex including a porous support and an acidic gas separation layer by forming an acidic gas separation layer containing a water-absorbing polymer, a carrier, and water on the porous support; and winding, around a perforated hollow central tube, a layered body including: the porous support; the acidic gas separation layer; and a flow channel material, which has a network structure having a thread intersection portion and an arithmetical surface roughness of a surface contacting the acidic gas separation layer in the thread intersection portion of 35 µm or less, the layered body being formed by disposing the flow channel material at a surface at a side of the acidic gas separation layer of the acidic gas separation complex.

<14> The method for manufacturing an acidic gas separation module according to the item <13>, further including: obtaining the flow channel material with a network shape using a thread including at least one resin selected from the group consisting of polyester, polypropylene, polyamide, polyphenylene sulfide, polytetrafluoroethylene, polyether ether ketone, and polyvinylidene fluoride; and performing thermal calendering on the obtained flow channel material to impart an arithmetical surface roughness of 35 µm or less at a surface contacting the acidic gas separation layer.

Advantageous Effects of Invention

According to the invention, an acidic gas separation module, in which damage of the surface of the acidic gas separation layer by the flow channel material during manufacture is effectively suppressed, while maintaining the generation efficiency of turbulent flow in the flow channel material, and which exhibits excellent acidic gas separation efficiency may be provided. Further, a method for manufacturing an acidic gas separation module, with which an acidic gas separation module exhibiting excellent acidic gas separation efficiency can be manufactured with high productivity, may be provided.

DESCRIPTION OF EMBODIMENTS

In this specification, a numerical range expressed by using the term "to" denotes a range including numerical values described in front of and behind "to" as the minimum value and the maximum value, respectively.

<Acidic Gas Separation Module>

In acidic gas separation modules, separation of various acidic gases can be performed by selecting the kind of the carrier in an acidic gas separation layer containing a water-absorbing polymer, a carrier, and water. Examples of the acidic gas which can be separated from a gas containing an acidic gas include carbon dioxide and hydrogen sulfide.

Hereinafter, the invention is explained with reference to an acidic gas separation module for separation of carbon dioxide, which is a representative exemplary embodiment of the acidic gas separation module of the invention; however, the invention is not limited to the following exemplary embodiment.

<Carbon Dioxide Separation Module>

Figure 1:
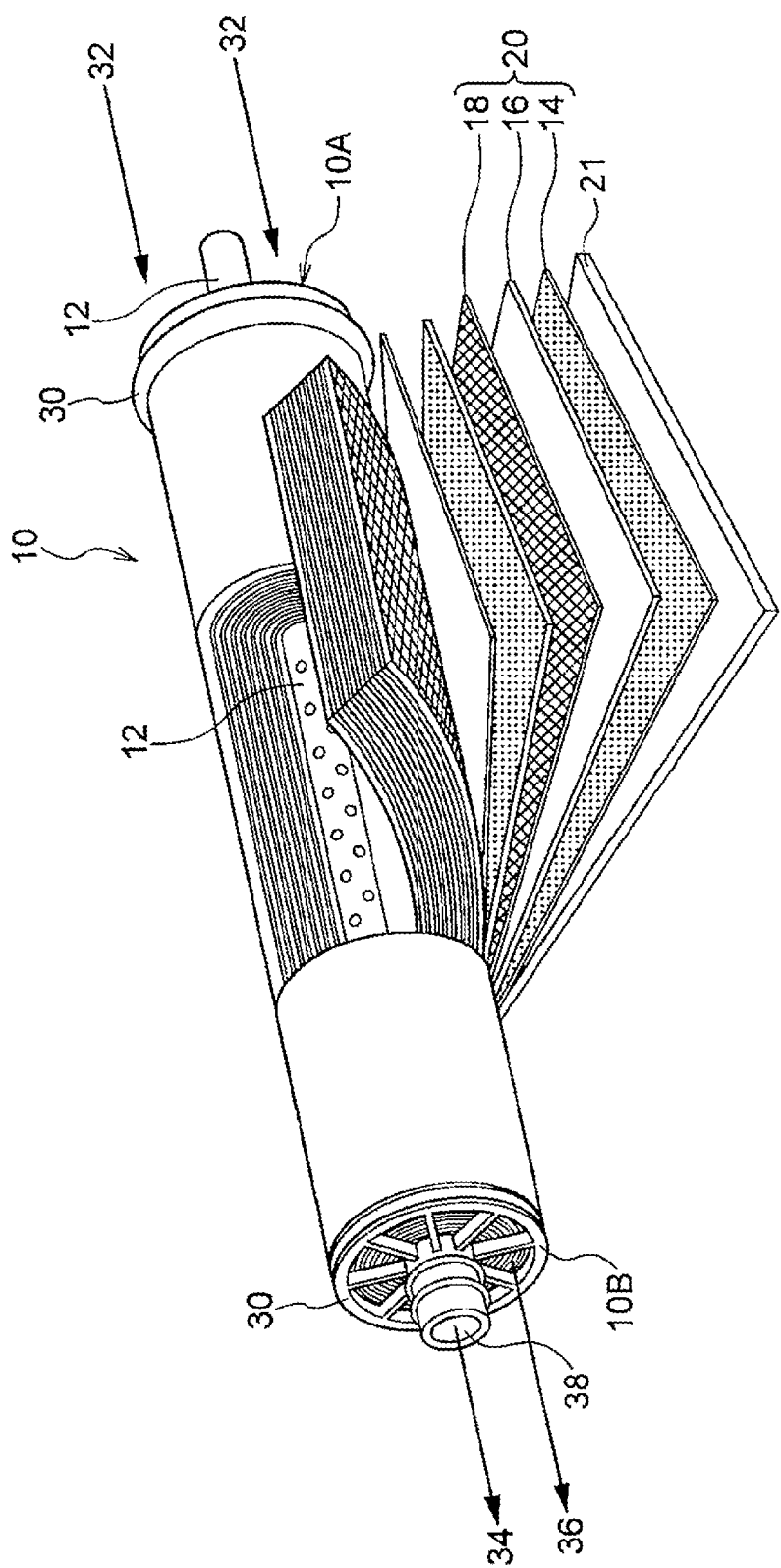
FIG. 1 is a schematic diagram showing an exemplary embodiment of a spiral-wound module for carbon dioxide separation according to the invention, with partial cutaway.

FIG. 1 is a schematic diagram showing an exemplary embodiment of a carbon dioxide separation module 10 according to the invention, with partial cutaway.

As a basic structure, the spiral-wound module 10 for carbon dioxide separation is configured by winding one or plural layered bodies 20 around a perforated hollow central tube 12, the layered body having a porous support 14, a carbon dioxide separation layer 16 containing a water-absorbing polymer, a carbon dioxide carrier, and water, and a flow channel material 18 with a network structure having a thread intersection portion and an arithmetical surface roughness for the surface contacting the carbon dioxide separation layer in the thread intersection portion of 35 μm or less, in this order. Further, the spiral-wound module is configured such that the circumference of the region, where carbon dioxide is separated and which includes the carbon dioxide separation layer 16 as the main constituent element, is covered with a covering layer 21, which is formed of a material capable of blocking fluid such as gas that passes through the module, and winding deviation prevention plates 30, which prevent winding deviation in the wound layered body 20, are mounted to both ends of the module 10, respectively.

In the carbon dioxide separation module 10 having such a configuration, when a source gas 32 including carbon dioxide is supplied to the layered body 20 from the side of one end portion 10A thereof, according to the configuration of the layered body 20, the source gas 32 is separated into carbon dioxide 34, which is discharged from a hollow part 38 in the other end portion of the hollow central tube 12, and a residual gas 36, and the gases are separately discharged to the side of the other end portion 10B.

FIG. 1 is a schematic diagram showing an exemplary embodiment of a spiral-wound module for carbon dioxide separation, with partial cutaway.

The carbon dioxide separation module 10 according to the invention is equipped with a perforated hollow central tube 12, and a layered body 20 that is wound on the perforated hollow central tube 12 and has a carbon dioxide separation layer 16 and a specific flow channel material 18 having a thread intersection portion, in this order on a porous support 14.

[Flow Channel Material with a Network Structure Having a Thread Intersection Portion and an Arithmetical Surface Roughness for the Surface Contacting the Acidic Gas Separation Layer in the Thread Intersection Portion of 35 μm or Less]

Hereinafter, the flow channel material (hereinafter, if appropriate, referred to as "specific flow channel material") with a network structure having a thread intersection portion and an arithmetical surface roughness for the surface contacting the acidic gas separation layer in the thread intersection portion of 35 μm or less, the flow channel material being an important constituent element of the invention, is explained in detail.

Figure 2A:
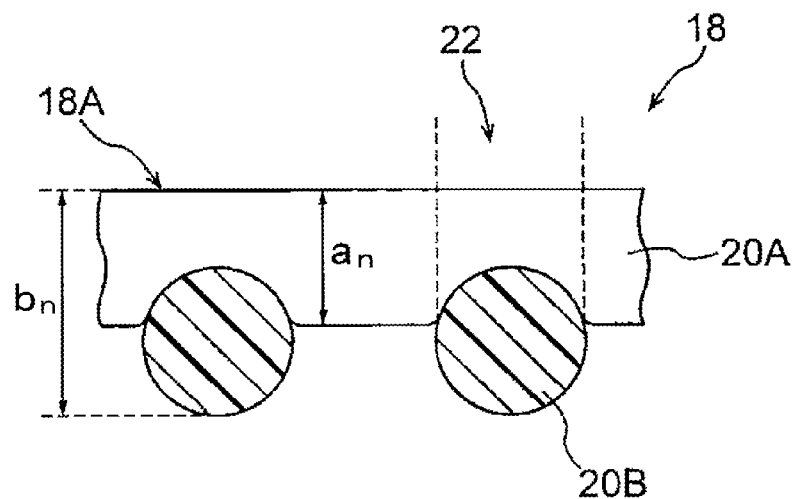
FIG. 2A is a conceptual sectional view showing an embodiment of a flow channel material with a network structure, which is used in an acidic gas separation module of the invention.
Figure 2B:
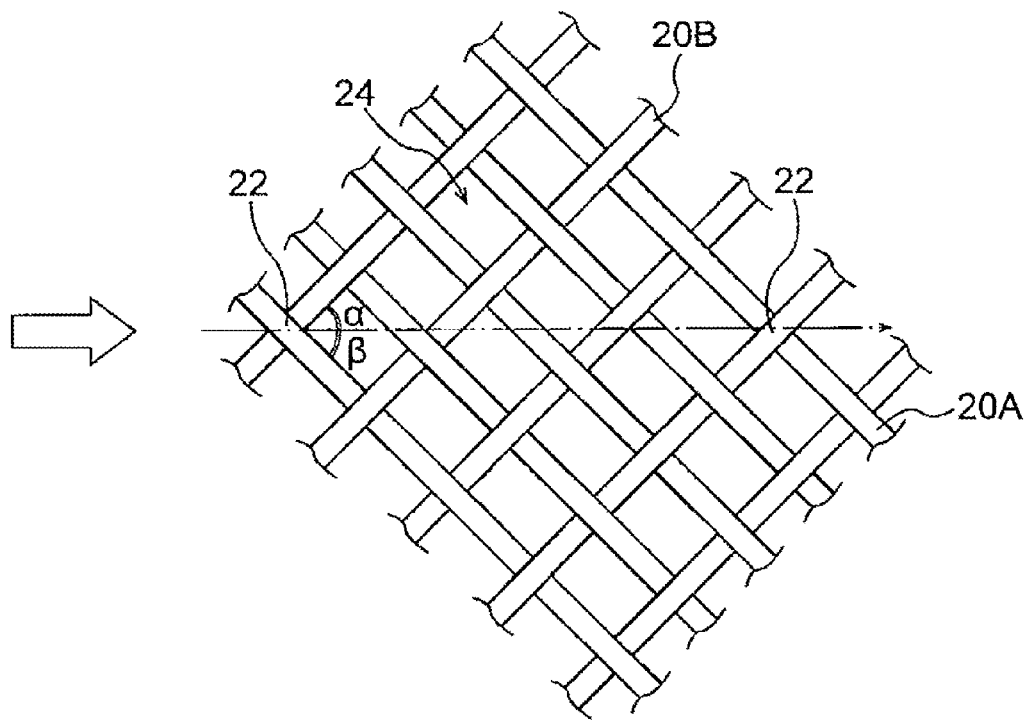
FIG. 2B is a plan view showing an embodiment of a flow channel material with a network structure, which is used in an acidic gas separation module of the invention.

FIG. 2A is a conceptual sectional view showing an embodiment of the specific flow channel material 18 according to the invention, and FIG. 2B is a plan view showing an embodiment of the specific flow channel material 18.

As shown in FIGS. 2A and 2B, the flow channel material 18 is constituted of threads 20A and 20B, and has a network structure having a thread intersection portion 22. In the conceptual sectional view of FIG. 2A, 18A represents the surface which contacts the carbon dioxide separation layer 16, and has an arithmetical mean surface roughness of 35 μm or less.

The shape of the flow channel material 18 and the like are not particularly limited, as far as the flow channel material has a network structure including a thread intersection portion 22, has a function of allowing gas to pass through, and is a material that causes generation of turbulent flow in the fluid. The flow channel material is formed using threads 20A and 20B, and has a thread intersection portion 22. In the case of forming the flow channel material using threads, the flow channel material may be formed by weaving the threads 20A and 20B as the warp and weft, or may be formed by superposing the threads 20A and 20B, each of which is a monofilament made of a resin, to cross each other in a lattice form, and fusing the point of intersection, or may be formed by weaving one or plural threads. According to any of these methods, a flow channel material with a network structure having a thread intersection portion 22 is formed. Above all, a method of obtaining a flow channel material with a network structure by extruding a resin from the nozzles of an extruder to form a weft thread 20A and a warp thread 20B as monofilaments, disposing them so as to cross each other, and fusing the thread intersection portions by thermal contact-bonding or the like is simple and is preferable from the viewpoint of ease of controlling the intersection angle between the weft thread 20A and the warp thread 20B, the area of void formed by the intersection of threads, and the like.

In the flow channel material 18 according to the invention, the arithmetical mean surface roughness for the surface 18A contacting the acidic gas separation layer (carbon dioxide separation layer) 16 is at least 35 μm or less, preferably from 0.1 μm to 35 μm, and more preferably from 0.1 μm to 25 μm.

Here, the method of measuring the arithmetical mean surface roughness of the flow channel material 18 in the invention is as follows.

First, using a magnification device utilizing a CCD camera, a cross section including the surface (the surface contacting the acidic gas separation layer) 18A of the flow channel material 18 is photographed, and by performing image processing, a roughness curve f(x) of the contact surface 18A is obtained.

From the obtained roughness curve f(x), a standard length of 2 cm is cut out along the direction of the average line. Then, drawing an X axis in the direction of the average line of the cut out portion and a Y axis in the direction of the longitudinal magnification, the roughness curve is represented by y=f(x). The value determined from the following formula and expressed in micrometers (μm) is designated as the arithmetical mean roughness in the invention.

$$Ra = \frac{1}{l}\int_0^l |f(x)|\,dx$$

In the flow channel material 18, there is no particular limitation as to the method (hereinafter, if appropriate, referred to as "smoothing method") for letting the arithmetical mean surface roughness for the surface 18A contacting the acidic gas separation layer (carbon gas separation layer) 16 be 35 μm or less, and a known method can be used, if appropriate. However, as shown in FIG. 2A, in order to reduce the surface roughness only for the surface 18A contacting the carbon dioxide separation layer 16 and, with regard to the other surface, in order to ensure a sufficient gas permeable path as a flow channel material 18, it is preferable that only one surface (the 18A face) is smoothed under the condition that the diameter of the thread 20B in FIG. 2A is maintained. From such a point of view, a preferable example of the smoothing method is a thermal calendering method.

Regarding the shape of the flow channel material 18, in consideration of mass production by R to R, it is preferable that the flow channel material is a substance that has been molded into a long belt-like shape, and also from such a point of view, a thermal calendering method capable of continuously performing smoothing is preferable.

In the flow channel material, an example of a specific method for letting the arithmetical surface roughness for the surface contacting the acidic gas separation layer be 35 μm or less is a method in which, in a pair of rollers for calendering, the roller that contacts the 18A face, in which the thread 20A is exposed, is a metal roller and is a roller that has been processed such that an arithmetical mean surface roughness of 35 μm or less is obtained, and treatment is performed at a heating temperature T (° C.), the temperature T satisfying the following relationship, when the melting peak temperature of a resin composition that has the lowest melting peak temperature, among the resin compositions contained in the flow channel material, is taken as Tm (° C.):

Tm−100(° C.)<T(° C.)<Tm(° C.)

and further, treatment is performed at a heat roll pressure of from 0.5 MPa to 10 MPa in terms of line pressure.

In this process, by the temperature of the heat roll being higher than Tm−100 (° C.), both surfaces of the raw flow channel material is smoothed in a favorable state. Further, by the temperature of the heat roll being lower than Tm (° C.), the shape of the thread is maintained, even when the constituent fiber in the flow channel material contacts the heat roll, and therefore, occurrence of the situation, in which the thread is fused into a film-like material and the function as a flow channel material is decreased, is effectively suppressed.

For example, in the invention, a flow channel material made of polypropylene is preferably used. When a monofilament of polypropylene is used as the raw material, processing is possible at a temperature of a heat roll of 50° C. or higher in performing thermal calendering, but it is preferable that thermal calendering is performed at a temperature T (° C.) satisfying 60 (° C.)<T (° C.)<120 (° C.), and particularly preferably 70 (° C.)<T (° C.)<110 (° C.).

Further, in this process, the pressure of the heat roll is preferably in a range of from 0.5 MPa to 7.5 MPa, and the case of performing thermal calendering at a pressure within the range of from 1 MPa to 6 MPa is more preferable.

By the heat roll pressure at the time of calendering being 0.5 MPa or higher, also in the case of performing a thickening process, smoothing of the flow channel material proceeds favorably. Further, when the heat roll pressure is made 10 MPa or lower, occurrence of matters, such that the distance between fibers becomes dense due to pressure or the pressure loss of the obtained flow channel material becomes higher due to the denseness, is suppressed. Further, when the heat roll pressure to be applied is adjusted to be within the above range, occurrence of damage of a raw flow channel material during the thickening process is also suppressed.

Further, in this process, by using, as the opposing roller, a retaining roller which has an elastic layer having a thickness greater than the mean diameter of the thread 20B, such as a flexible rubber layer, on the surface and is not equipped with a heating means, and by performing thermal calendering using such a pair of rollers, for example, in a case in which only one surface of the flow channel material contacts the carbon dioxide separation layer 16, only the surface 18A that contacts the carbon dioxide separation layer 16 can be smoothed.

Moreover, for example, in the case of forming the flow channel material in accordance with a fusion method, it is possible to reduce the arithmetical surface roughness also by extruding a weft thread and a warp thread from the nozzles of an extruder, while applying an appropriate tension, and then immersing the threads in a cooling bath. Regarding the shape of the nozzle hole of the extrusion die, a precise circle shape or an oval shape can be used.

It is also possible to reduce the arithmetical surface roughness by surface polishing, surface homogenization by leveling involving dissolution of surface by a solvent, reinforcement by applying a resin to the concave portions, or the like.

The thread that constitutes the flow channel material 18 may be a monofilament or a twist yarn. There may be a case in which the carbon dioxide separation module 10 according to the invention is used under a temperature condition of 100° C. or higher, for example, about 130° C., and under a high humidity condition, and therefore, as the material that constitutes the thread, a material having heat resistance and does not have water absorbing property is preferably used.

As the material of the thread, specifically, for example, materials including one or more resins selected from the group consisting of polyester, polypropylene, polyamide, polyphenylene sulfide, polysulfone, polytetrafluoroethylene, polyether ether ketone, polyvinylidene chloride, polyether sulfone, polycarbonate, and polyvinylidene fluoride are preferable, and one or more resins selected from the group consisting of polypropylene, polytetrafluoroethylene, polysulfone, and polyether sulfone are more preferable.

Even if the thread is a monofilament or a twist yarn, the mean diameter ("a") of the thread is preferably from 100 µm to 500 µm, from the viewpoint of ensuring sufficient gas permeability as the flow channel material 18.

When "a" represents the mean diameter of the thread 20A in the region other than the thread intersection portion 22 in the flow channel material 18, and "b" represents the layer film thickness of the flow channel material 18, it is preferable that "a" and "b" satisfy the relationship shown in the following Formula (1).

$$b<2a \quad \text{Formula (1)}$$

Here, the mean diameter "a" of the thread 20A is determined as follows. As shown in FIG. 2A, in the thread 20A that constitutes the network structure, the diameter (which is represented by $a_n$ in FIG. 2A) of the thread in the region excluding the vicinity of the intersection portion 22 or the vicinity of the point where the threads are fused with each other is measured at 10 points, and the arithmetical average value thereof is defined as the mean diameter "a" of the tread 20A.

In the process of measuring the mean diameter "a" of the thread 20A, when the cross section of the thread has a round shape, the diameter thereof is employed, and when the cross section of the thread 20A is a deformed cross section or a flat cross section, in the portion to be measured, the diameter length of the thread in the thickness direction of the flow channel material 18 is designated as the thread diameter. The thread diameter may be measured directly using calipers or the like, or may be visually measured while conducting magnification using a magnifying lens or the like. Alternatively, a cross section of the flow channel material 18, as shown in FIG. 2A, may be photographed to measure the thread diameter in the image.

Regarding the thickness of the flow channel material, if the material has a network structure with fine knots (for example, the void area is 1 mm² or less), it is possible to measure the thickness by using a thickness measuring device used for cloths and the like. In this case, the measured value itself is defined as the layer film thickness (b) of the flow channel material 18. Alternatively, in a case in which measurement of the exact film thickness is difficult by using the above thickness measuring device, such as a case in which the void area of the network structure is great, a case in which the thickness of the thread intersection portion 22 is significantly thick, or a case in which the thickness of the thread intersection portion is significantly thick as compared with the region, in the vicinity of the thread intersection portion, where only the thread 20A is present, the thickness obtained by visually measuring the thickness of the thread intersection portion 22 or the portion where threads are fused, by using calipers or a magnifying lens while conducting magnification, or the like is defined as the layer film thickness ("b") of the flow channel material.

Note that, as the layer film thickness "b", the average value of the values (represented by $b_n$ in FIG. 2A) measured at 10 different points in the flow channel material 18 is adopted.

Figure 3:
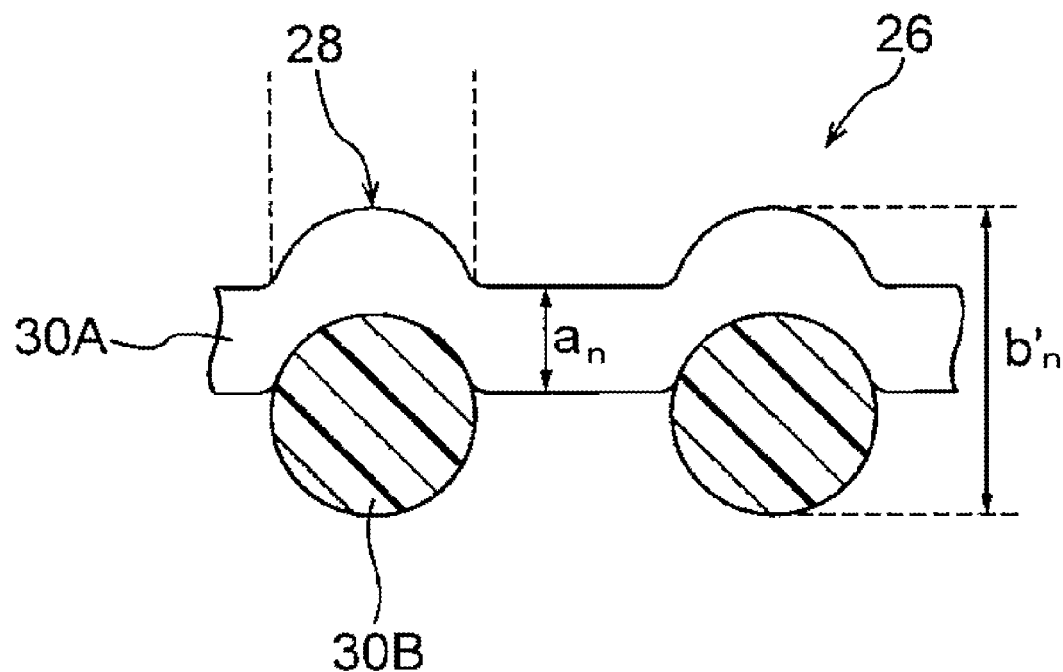
FIG. 3 is a conceptual sectional view showing an embodiment of a flow channel material with a network structure, which is used in a conventionally used acidic gas separation module.

In a known flow channel material 26 as shown in the conceptual sectional view of FIG. 3, in an intersection portion 28 of thread 30A and thread 30B, the thickness ($b_n'$) becomes drastically thick, as compared with the portions where only the thread 30A having a thread diameter of $a_n$ is present, not the thread intersection portion 28, so that the requirement of Formula (1) above is not satisfied. Further, the arithmetical mean surface roughness is about 50 µm for both surfaces, and thus, when the flow channel material is brought into contact with a carbon dioxide separation layer 16 which serves as a hydrous gel membrane, the surface of the membrane may be damaged.

The area of the void (the region of the opening in the mesh shown by using oblique lines in FIG. 2B) 24, which is formed by the network structure of the flow channel material 18, is preferably from 0.5 mm² to 20 mm², and more preferably from 0.7 mm² to 15 mm², from the viewpoints that the pressure loss can be reduced and that the adjacent carbon dioxide separation layer is less likely to penetrate into the voids. The mesh size is preferably such that the sieve mesh size is from 30 µm to 2,000 µm. The void area in a plan view of the network structure can be easily adjusted with the threads 20A and 20B, by controlling the knitting conditions, the weaving conditions, the conditions when crossing the threads with each other before fusion, or the like.

When the area of the void in the network structure and the sieve mesh size are within the above ranges, respectively, the gas permeability is improved, and also, stretch resistance with respect to the tensile strength when conducting continuous manufacture by R to R, and handling property are improved.

Since the flow path of fluid changes according to the shape of the network structure of the flow channel material 18, the shape of the unit lattice of the network structure is selected as appropriate from, for example, a diamond shape, a parallelogram shape, or the like, according to the purpose, and used.

Here, from the viewpoint of further improving the turbulent flow effect, it is preferable to have a network structure, in which the sum ($\alpha+\beta$) of the angles (the angles $\alpha$ and $\beta$ in FIG. 2B) formed by the direction (indicated by an arrow in FIG. 2B) of flow of the acidic gas to be separated and the threads 20A and 20B, respectively, with the thread intersection portion 22 in the flow channel material 18 as the basic point, is 85° or more, and it is more preferable to have a network structure in which the sum of the angles is 90° or more.

By using the flow channel material 18 according to the invention, in which at least the surface on the side contacting the carbon dioxide separation layer 16 is smooth and which has sufficient gas permeating property, excellent effects of the invention are exhibited.

In the following, other constituent elements of the spiral-wound module 10 for carbon dioxide separation, which is an exemplary embodiment of the invention, and the method for manufacturing the spiral-wound module 10 for carbon dioxide separation are explained.

The spiral-wound module 10 for carbon dioxide separation is formed by winding, on a perforated hollow central tube 12, a layered body 20 which is obtained by superposing a smoothed face of the flow channel material 18 with a network structure onto a surface of the carbon dioxide separation layer 16 of a complex for carbon dioxide separation equipped with a carbon dioxide separation layer 16 on a porous support 14.

First, a carbon dioxide separation layer 16 is formed on a porous support 14.

(Porous Support)

The porous support 14 used in the invention is not particularly limited as far as the support has gas permeability, specifically, permeability of acidic gas, such as carbon dioxide, which is subjected to separation.

As the material of the porous support, paper, high quality paper, coated paper, cast coated paper, synthetic paper, cellulose, polyester, polyolefin, polyamide, polyimide, polysulfone, aramid, polycarbonate, a metal, glass, ceramics, or the like can be preferably used. More specifically, preferable examples include resin materials such as polyethylene, polystyrene, polyethylene terephthalate, polytetrafluoroethylene, polyether sulfone, polyphenylene sulfide, polysulfone, polypropylene, polyether imide, polyether ether ketone, or polyvinylidene fluoride.

Regarding the form of the support, a porous resin sheet is preferable, and a complex of a porous resin sheet and a non-woven fabric is also preferable, from the viewpoint of being able to prevent penetration of the carbon dioxide separation layer, specifically, penetration of a material included in the carbon dioxide separation layer 16, which is caused by a decrease in the viscosity due to the use for gas separation in a humidification environment, change in the shape under a high-pressure environment, or the like. In the case of a complex of a porous resin sheet and a non-woven fabric, it is more preferable that the carbon dioxide separation layer 16 is transferred and formed onto the membrane face side of the porous resin sheet.

Regarding the porous resin sheet, from the viewpoint of suppressing the penetration of a material in the carbon dioxide separation layer, it is preferable that the pore size of the porous resin sheet is small. Specifically, the maximum pore diameter is preferably from 0.05 μm to 0.5 μm, and more preferably 0.2 μm or less. From the viewpoint of availability, the maximum pore diameter is more suitably in a range of from 0.05 μm to 0.2 μm.

Note that, the maximum pore diameter of a porous membrane in the invention is measured by the following method.

Regarding the determination of maximum pore diameter, the maximum pore diameter (bubble point) is measured in accordance with a bubble point method. As the measuring device, a PERM-POROMETER (trade name, manufactured by Pore Materials, Inc.) is used (in accordance with JIS K 3832). Specifically, a porous membrane cut out into a size of 3 cm square is immersed in a surfactant liquid (trade name: GALWICK). Then the porous membrane is taken out and extra surfactant liquid is slightly wiped out, and then the resulting porous membrane is put between two sheets of metal mesh and mounted into a measurement cell of the device. As the measurement liquid, a GALWICK liquid is used, and while gradually applying pressure with air at room temperature (25° C.), the bubble point is measured.

It is preferable that at least the surface of the porous support 14 on the side that contacts the carbon dioxide separation layer 16 is a hydrophobic surface. When the surface is hydrophilic, penetration of a carbon dioxide separation layer containing moisture under the usage environment into porous portions is facilitated, and film thickness distribution or aging-induced deterioration in performance may be caused.

Here, the term "hydrophobic" refers to that the contact angle of water at room temperature (25° C.) is from about 100° to about 130°.

Generally, a membrane body having a high self-supportability and a high porosity can be preferably used as the porous resin sheet. Above all, a porous resin sheet formed from a material including one or more resins selected from the group consisting of polypropylene and fluorine-containing resins is preferable.

More specifically, a stretched porous membrane of polyphenylene sulfide, polysulfone, polytetrafluoroethylene, polyvinylidene fluoride, or a high-molecular weight polyethylene, and the like have high porosity, exhibit reduced blockage effects on carbon dioxide diffusion, and are preferable from the viewpoints of strength and production suitability.

Above all, from the viewpoints of heat resistance and durability, as the resin material that constitutes the porous support, at least one of polytetrafluoroethylene (PTFE), polyether sulfone, polyphenylene sulfide, polysulfone, polypropylene, polyether imide, polyether ether ketone, or polyvinylidene fluoride (PVDF) is preferable. Polytetrafluoroethylene can be particularly preferably used, from the viewpoint of stability over time.

The carbon dioxide separation module 10 according to the invention is often used, for example, under a high temperature of about 130° C. and under humidification using vapor, although the usage temperature differs according to the usage applied. Therefore, it is preferable that the porous support 14 is formed from a material having heat resistance such that the pore structure hardly changes even at 130° C., and having low hydrolyzability. From such viewpoints, it is preferable that the porous support is formed from a material including one or more resins selected from the group consisting of polypropylene and fluorine-containing resins such as polytetrafluoroethylene (PTFE) or polyvinylidene fluoride (PVDF). A more preferable form of the support is a PTFE porous membrane.

These porous resin sheets can be used singly; however, a composite membrane in which a porous resin sheet is integrated with a membrane for reinforcement, for example, a composite membrane obtained by disposing, for reinforcement, a non-woven fabric having excellent gas permeability on a surface of a porous resin sheet on the side that does not contact the carbon dioxide separation layer 16, so that the porous resin sheet is integrated with the non-woven fabric, or the like can also be used preferably as the support.

The membrane for reinforcement is not particularly limited, as far as the membrane has favorable strength, stretch resistance, and gas permeability, and a non-woven fabric, a woven fabric, a mesh having a mean pore diameter of from 0.001 μm to 10 μm, or the like can be selected as appropriate and used.

Similar to the porous support described above, it is preferable that the membrane for reinforcement is also formed from a material having heat resistance such that the degree of lowering of strength or deterioration in stretch resistance is small, and having low hydrolyzability. It is preferable that the fiber that constitutes the non-woven fabric, woven fabric, or knitted fabric is a fiber formed from a heat resistant resin having excellent durability and excellent heat resistance, such as polypropylene, modified polyamide such as ARAMID (trade name), or a fluorine-containing resin such as polytetrafluoroethylene or polyvinylidene fluoride. It is preferable that the resin material that constitutes the mesh is also formed from the same material.

Next, a carbon dioxide separation layer 16 is formed on the porous support 14. Note that, hereinafter, the porous support 14 or the porous support 14 which is reinforced, if desired, with a reinforcing material sheet such as a non-woven fabric or the like may be referred to as, merely, "support 14".

The manufacturing apparatus that forms the carbon dioxide separation layer 16 is equipped with a let-off roller, as an example of a conveying means, which sends off the belt-like support 14 in a definite direction, and plural rear face supporting rollers which support the support. A coating device for coating the coating liquid for forming a carbon dioxide separation layer, which is described below, on the surface of the support 14, and a drying device for drying, in a non-contacting manner, the coated membrane formed from the coating liquid for forming a carbon dioxide separation layer, which has been coated on the support 14, thereby obtaining a carbon dioxide separation layer, are provided in the order from the upstream side to the downstream side along the conveyance direction of the support 14 that has been sent off from the let-off roller. In the case of using a coating liquid composition containing a gelling agent that performs gelation at a low temperature, a cooling unit, as an example of a cooling device for cooling in a non-contacting manner to obtain a gel membrane, may be provided in the upstream of the drying device.

(Coating Liquid for Forming Carbon Dioxide Separation Layer)

The coating liquid (aqueous composition) for forming a carbon dioxide separation layer, which is coated on a surface of the support 14 by using a coating device, is prepared by adding at least a water-absorbing polymer and a carbon dioxide carrier, each in an appropriate amount, to water. It is enough that the coating liquid for forming a carbon dioxide separation layer contains at least a water-absorbing polymer that retains the coated membrane, a carbon dioxide carrier, and water, and various known additives may be used in combination, if necessary. For example, a gelling agent for adjusting the viscosity of the coating liquid may be used in combination, for the purpose of improving the coating uniformity.

Hereinafter, the respective components which can be included in the coating liquid for forming a carbon dioxide separation layer are explained.

1. Water-Absorbing Polymer

The water-absorbing polymer contained in the coating liquid (aqueous composition) according to the invention is a polymer that functions as a binder, and when used in a carbon dioxide separation layer, the water-absorbing polymer retains moisture and allows the function of separation of carbon dioxide by a carbon dioxide carrier to be exhibited. The water-absorbing polymer is preferably a substance which dissolves in water and can form a coating liquid, and also has a high water absorbing property, from the viewpoint that the carbon dioxide separation layer has a high water absorbing property (moisture retaining property). It is preferable that the water-absorbing polymer has a water absorbing property of 10 times or more.

As the water-absorbing polymer contained in the coating liquid (aqueous composition) according to the invention, for example, a polyvinyl alcohol-polyacrylic acid (PVA-PAA) copolymer, polyvinyl alcohol, polyacrylic acid, polyacrylic acid salts, polyvinyl butyral, poly-N-vinyl pyrrolidone, poly-N-vinyl acetamide, and polyacrylamide are preferable, and a PVA-PAA copolymer is particularly preferable, from the viewpoints of water absorbing property, film-forming property, strength, and the like. PVA-PAA copolymers have high water absorbing ability, and in addition, the strength of the hydrogel is great, even at the time of high water absorption. The content ratio of polyacrylic acid salt in the PVA-PAA copolymer is, for example, from 5 mol % to 95 mol %, and preferably from 30 mol % to 70 mol %. Examples of the polyacrylic acid salt include an alkali metal salt such as a sodium salt or a potassium salt, an ammonium salt, and an organic ammonium salt.

An example of a commercially available PVA-PAA copolymer is KURASTMER AP-20 (trade name, manufactured by Kuraray Co., Ltd.).

Although it depends on the kind, the content of the water-absorbing polymer in the coating liquid (aqueous composition) is preferably from 1% by mass to 30% by mass, and more preferably from 2% by mass to 15% by mass, from the viewpoint of forming a membrane as a binder and producing a carbon dioxide separation layer which can sufficiently retain moisture.

2. Carbon Dioxide Carrier

It is enough that the carbon dioxide carrier contained in the coating liquid (aqueous composition) according to the invention has affinity with carbon dioxide and exhibits water solubility, and a known substance can be used. The carbon dioxide carrier in this case is a substance having affinity with carbon dioxide, and various kinds of water-soluble inorganic or organic substances that exhibit basic properties may be used. Examples thereof include an alkali metal carbonate, an alkali metal hydrogencarbonate, and an alkali metal hydroxide.

Examples of the alkali metal carbonate include lithium carbonate, sodium carbonate, potassium carbonate, rubidium carbonate, and cesium carbonate.

Examples of the alkali metal hydrogencarbonate include lithium hydrogencarbonate, sodium hydrogencarbonate, potassium hydrogencarbonate, rubidium hydrogencarbonate, and cesium hydrogencarbonate.

Examples of the alkali metal hydroxide include cesium hydroxide, and rubidium hydroxide.

Among them, one or more selected from the group consisting of cesium carbonate, cesium hydrogencarbonate, cesium hydroxide, rubidium carbonate, rubidium hydrogencarbonate, and rubidium hydroxide is preferable as the carbon dioxide carrier.

The carbon dioxide carriers may be used in mixture of two or more kinds thereof.

In the case of separating hydrogen sulfide as the acidic gas, it is preferable to use one or more selected from the group consisting of sodium hydroxide, potassium hydroxide, and cesium hydroxide, as the carrier.

Although it depends on the kind, the content of the carbon dioxide carrier in the coating liquid (aqueous composition) is preferably such that the content of the carbon dioxide carrier in the composition for forming a carbon dioxide separation layer is from 0.5% by mass to 30% by mass, more preferably from 3% by mass to 20% by mass, and particularly preferably from 5% by mass to 15% by mass, in order to prevent salting-out before coating and reliably exhibit the function of separation of carbon dioxide.

3. Additional Components

The coating liquid for forming a carbon dioxide separation layer used in the invention (hereinafter also referred to as, simply, "coating liquid composition") can include one or more additional components (additives), other than the water-absorbing polymer, the carbon dioxide carrier, or water, to the extent of not exerting any adverse influence on film-forming properties (coating property and setting property) or gas separation characteristics of a carbon dioxide separation layer formed from the coating liquid.

Examples of the components that may be used arbitrary include a gelling agent that controls the setting property of the coated membrane or the viscosity, a crosslinking agent for enhancing the membrane strength, a carbon dioxide absorption accelerator that assists the function of the carrier, and further, a surfactant, a catalyst, an auxiliary solvent, a membrane strength adjusting agent, and a defect detecting agent.

3-1. Gelling Agent As the gelling agent that is contained in the coating liquid composition according to the invention, a gelling agent may be used, which can form a gel membrane (set membrane) having high film thickness uniformity, when a coated membrane is formed by coating, on a support, a coating liquid obtained by adding the gelling agent to an aqueous solution containing a water-absorbing polymer and a carbon dioxide carrier, or when the coated membrane is cooled.

Examples of a gelling agent having reduced dependency on temperature include thickeners such as carboxymethyl cellulose. Further, examples of a gelling agent capable of forming a gel membrane by cooling include thickening polysaccharides, and more specifically, agars. As such a polysaccharide, agar is preferable from the viewpoints of film forming property, availability, cost, membrane strength, and the like. Examples of a commercially available product include INA AGAR UP-37, UM-11S, SY-8, ZY-4, and ZY-6 (all trade names, manufactured by Ina Food Industry Co., Ltd.), and AGAROSE H and AGAROSE S (all trade names, manufactured by NIPPON GENE CO., LTD.).

A specific example of the gelling agent capable of forming a gel membrane by cooling is a gelling agent having a nature such that, when a coating liquid composition including a hydrophilic polymer, a carbon dioxide carrier, a gelling agent, and water is prepared at a temperature of 50° C. or higher, in the solution membrane thickness of 1 mm or less, gelation occurs within 120 seconds under the temperature condition of 12° C., and the liquid does not fall due to gravity.

Regarding the content of the polysaccharide in the coating liquid for forming a carbon dioxide separation layer, although it depends on the kind, when the content of the polysaccharide is too large, there are cases in which the coating liquid becomes highly viscous in a short time such that coating becomes difficult, and there is a possibility that coating defects may occur. Further, from the viewpoint of suppressing the lowering of uniformity in film thickness, the content of the polysaccharide is preferably 10% by mass or less, more preferably from 0.1% by mass to 8% by mass, and still more preferably from 0.3% by mass to 5% by mass, with respect to the total mass of the coating liquid for forming a carbon dioxide separation layer.

3-2. Crosslinking Agent

The strength of the carbon dioxide separation layer may be enhanced by allowing the water-absorbing polymer to form a crosslinked structure. In this case, for crosslinking, a conventionally known technique such as thermal crosslinking, ultraviolet ray crosslinking, electron beam crosslinking, or radiation crosslinking may be carried out. Particularly, from the viewpoint of enhancing the membrane strength, it is preferable to form a crosslinked structure by using a crosslinking agent having two or more functional groups (also referred to as "crosslinkable functional groups") capable of performing thermal crosslinking by reacting with a water-absorbing polymer such as a polyvinyl alcohol-polyacrylic acid salt copolymer. Examples of the crosslinking agent having two or more crosslinkable functional groups, which can be used for this purpose, include a polyvalent glycidyl ether, a polyhydric alcohol, a polyvalent isocyanate, a polyvalent aziridine, a haloepoxy compound, a polyvalent aldehyde, and a polyvalent amine.

3-3. Carbon Dioxide Absorption Accelerator

A carbon dioxide absorption accelerator is a compound that accelerates the reaction between carbon dioxide and a carbon dioxide carrier, and denotes a nitrogen-containing compound or a sulfur compound.

Examples of the nitrogen-containing compound, which can be used, include amino acids such as glycine, alanine, serine, proline, histidine, taurine, or diaminopropionic acid; heterocyclic compounds such as pyridine, piperazine, imidazole, or triazine; alkanolamines such as monoethanolamine, diethanolamine, triethanolamine, monopropanolamine, dipropanolamine, or tripropanolamine; cyclic polyether amines such as cryptand[2.1] or cryptand[2.2]; bicyclic polyether amines such as cryptand[2.2.1] or cryptand[2.2.2]; porphyrin, phthalocyanine, and ethylenediamine tetraacetate.

Examples of the sulfur compound, which can be used, include amino acids such as cystine or cysteine; polythiophene, and dodecylthiol.

In the case of adding a carbon dioxide absorption accelerator, the carbon dioxide absorption accelerator is added to at least one of the layers that constitute the gel membrane, and it is suitable that the addition amount thereof is in a range of from 20% by mass to 200% by mass with respect to the layer to be added.

(Formation of Carbon Dioxide Separation Layer)

The carbon dioxide separation layer is formed by coating, using a coating device, a coating liquid composition for forming a carbon dioxide separation layer, which is preferably prepared at a temperature of from 50° C. to 90° C., on a surface of a support 14 that is conveyed in a definite direction, followed by drying.

1. Preparation of Coating Liquid Composition

Preparation of the coating liquid composition is conducted by adding the above-described water-absorbing polymer, carbon dioxide carrier, and water, and further, if necessary, additional additives such as a gelling agent or a crosslinking agent, each in an appropriate amount, to water (normal temperature water or heated water), stirring the mixture sufficiently and, if necessary, heating while stirring, to accelerate dissolution. Note that, the water-absorbing polymer, the carbon dioxide carrier, and the additional components may be separately added to water, or a mixture obtained by mixing them in advance may be added to water.

Preparation of the coating liquid composition is preferably performed at a temperature of from 50° C. to 90° C., from the viewpoint of uniformity.

2. Coating of Coating Liquid Composition

When the temperature of the coating liquid composition lowers at the time of coating by using a coating device, the water-absorbing polymer may be deposited (salted out), so that uniform coating on a support may become difficult or the variation in film thickness may become more significant. Therefore, in the invention, it is preferable to keep the temperature within a period after preparation of the coating liquid composition until coating, such that salting out does not occur. The temperature of the coating liquid composition at the time of coating may be determined according to the composition or the concentration, such that gelation or salting-out does not occur. However, when the temperature is too high, there is concern that a large amount of water may evaporate from the coating liquid composition, so that the composition concentration may be changed or gelation may partially proceed. Thus, the temperature of the coating liquid composition at the time of coating is usually from 50° C. to 90° C., and preferably from about 60° C. to about 85° C.

The coating device as an exemplary embodiment used in the manufacturing method of the invention is equipped with a storage section A which stores the thus prepared coating liquid for forming a carbon dioxide separation layer, and a coating die in which the coating liquid stored in the storage section flows out and approaches to the rear face supporting roller at the time of coating. In the coating die, the flow rate of the coating liquid and the width of the space between the coating die and the support can be freely adjusted, and coating can be performed at various thicknesses on supports having various thicknesses. The storage section may be provided with a heater for controlling the temperature of the coating liquid composition, and a stirring device for stirring the coating liquid.

The coating device is not limited to the above configuration and, for example, a curtain flow coater, an extrusion die coater, an air doctor coater, a blade coater, a rod coater, a knife coater, a squeeze coater, a reverse roll coater, a bar coater, or the like is selected as appropriate. Particularly, from the viewpoints of the film thickness uniformity, the coating amount, and the like, an extrusion die coater is preferable.

Regarding the coating amount, although it depends on the composition of the coating liquid composition, the concentration, and the like, when the coating amount per unit area is too small, a hole may be formed in the coated membrane during the drying process, or the strength as a carbon dioxide separation layer may become insufficient. Meanwhile, when the coating amount is too large, variation in film thickness may become more significant, or the film thickness of the carbon dioxide separation layer obtained may become too large, so that the permeability of carbon dioxide may be lowered.

From the viewpoints described above, it is preferable to adjust the coating amount such that the thickness of the coated membrane is 30 µm or more, more preferably 50 µm or more, and particularly preferably 100 µm or more, and the thickness of the carbon dioxide separation layer obtained after the heating process is preferably from 5 µm to 50 µm, more preferably from 10 µm to 40 µm, and particularly preferably from 15 µm to 30 µm.

3. Drying of Coated Membrane

In drying the layer formed from the coating liquid composition, the coated membrane of the coating liquid composition formed on the support 14 is dried in the drying unit, to obtain a carbon dioxide separation layer 16. In this process, if desired, thermal crosslinking may be performed at the same time. For example, drying is performed by applying hot air to the coated membrane on the support 14 that has been conveyed to the drying unit, and in a case in which the coating liquid composition includes a crosslinking agent, a crosslinking reaction proceeds by this hot air heating.

The velocity of air is preferably adjusted to a velocity, with which the coated membrane can be rapidly dried and which does not cause collapse of the coated membrane, for example, from 1 m/min to 80 m/min, and is more preferably from 6 m/min to 70 m/min, and particularly preferably from 10 m/min to 40 m/min.

The temperature of air is preferably set from 20° C. to 80° C., such that deformation of the support or the like is not caused, and the coated membrane can be dried rapidly. The temperature of air is more preferably from 30° C. to 70° C., and particularly preferably from 40° C. to 60° C.

At the time of drying, in a case in which the coating liquid composition includes a crosslinking agent, drying and crosslinking may be carried out simultaneously or may be carried out separately. For example, crosslinking may be performed by using a heating means such as an infrared heater or the like, after drying the coated membrane by applying hot air; or drying and crosslinking may be performed simultaneously, by using hot air. Thermal crosslinking can be conducted, for example, by heating to a temperature of from about 100° C. to about 150° C.

In a preferable embodiment, the drying unit is equipped with a housing for conveying in or conveying out the support 14 having a coated membrane formed thereon by using the coating liquid, and plural hot air heaters and plural halogen heaters for drying the coated membrane on the surface of the support 14 placed in the housing. The hot air heaters are arranged at predetermined intervals with respect to the surface of the support 14, and by applying hot air to the surface of the support 14, the coated membrane on the support 14 is dried, to obtain a carbon dioxide separation layer 16.

The halogen heaters are arranged at predetermined intervals with respect to the surface of the support 14, and with these halogen heaters, the coated membrane on the support 14 is dried by heat. In the exemplary embodiment of the invention, plural hot air heaters and plural halogen heaters are arranged alternatively, and by using these hot air heaters and halogen heaters, the coated membrane on the surface of the support 14 is dried and, at the same time, is thermally crosslinked, to obtain a carbon dioxide separation layer 16. In the exemplary embodiment of the invention, plural hot air heaters and plural halogen heaters are arranged alternatively; however the invention is not limited to this configuration and, for example, a configuration of arranging only plural hot air heaters may be adopted.

Further, in the apparatus for manufacturing a carbon dioxide separation layer, if necessary, a coating device, a drying device, and the like, which are used for forming a carrier elution prevention layer on the surface of the carbon dioxide separation layer 16 that is formed on the surface of the support 14, may be provided at the downstream side with respect to the drying unit in the conveyance direction of the support 14.

By going through these coating and drying processes, a carbon dioxide separation layer 16 having substantially uniform film thickness is formed on the support 14.

A complex for carbon dioxide separation, which has a carbon dioxide separation layer 16 on the support 14, may be a complex having an additional layer other than the carbon dioxide separation layer 16 on the support 14. Examples of the additional layer include an undercoat layer and an intermediate layer, which are disposed between the porous support 14 and the carbon dioxide separation layer 16, and a protective layer (for example, a carrier elution prevention layer), which is disposed on the carbon dioxide separation layer 16.

In the manufacture of such a carbon dioxide separation layer 16, while conveying the belt-like support 14 in a definite direction, a carbon dioxide separation layer 16 having substantially uniform film thickness can be manufactured on the support 14, stably, with high productivity.

<Spiral-Wound Module for Carbon Dioxide Separation and Manufacturing Method Thereof>

The thus obtained complex including a porous support 14 and a carbon dioxide separation layer 16 is incorporated in a carbon dioxide separation module 10 and used. There is no particular limitation as to the kind of carbon dioxide separation module for incorporation, and the complex is used in a known device, if appropriate. In the exemplary embodiments described below, a spiral-wound module is explained as an example, but the invention is not limited thereto.

The spiral-wound module 10 for carbon dioxide separation according to the invention is obtained by superposing, on a surface of a carbon dioxide separation layer 16 provided on a porous support 14, a flow channel material 18 with a network structure, which has been subjected to smoothing such that at least the surface contacting the carbon dioxide separation layer 16 has an arithmetical roughness of 35 μm or less, and spirally winding the resulting layered body around a perforated hollow central tube 12.

Here, it is preferable that the tube wall of the perforated hollow central tube 12 is provided with a slit (not shown in the figure) along the axial direction. In this case, a tip of the layered body 20 is inserted into the slit, and fixed to the inner peripheral face of the hollow central tube 12 with a fixation member (not shown in the figure). With this configuration, when winding the layered body 20 including the carbon dioxide separation layer 16 on the central tube 12, even if winding is performed while applying tension, the fixation of the layered body 20 is maintained.

Alternatively, in the case of winding the layered body 20 on the perforated hollow central tube 12, a tip of the long-shaped layered body 20 may be fixed, in advance, to the tube wall (outer peripheral face) of the perforated hollow central tube 12 with a fixation member such as KAPTON (registered trademark) tape or an adhesive agent.

As shown in FIG. 1, in the case of winding one or plural layered bodies 20 including a porous support 14, a carbon dioxide separation layer 16, and a flow channel material 18 around a perforated hollow central tube 12, the flow channel material 18 is only disposed on the carbon dioxide separation layer 16 that serves as a gel membrane, without being specially fixed, and the surface of the carbon dioxide separation layer 16 may be rubbed with the flow channel material 18 having a network structure and may be damaged, due to dislocation or a bend when winding up. However, in the invention, since the surface of the flow channel material 18, which contacts the carbon dioxide separation layer 16, is smoothed, damage of the carbon dioxide separation layer 16 and occurrence of membrane defects due to the damage are effectively prevented, and productivity is significantly improved as compared with a conventional one.

In the case of disposing a flow channel material 18 on a carbon dioxide separation layer 16, a flow channel material 18 may be disposed on a surface of a carbon dioxide separation layer 16 to form a layered body, or a substance prepared by disposing a flow channel material 18 having a length that is about half the length in the longitudinal direction of the complex including the support 14 and the carbon dioxide separation layer 16 on a surface of a carbon dioxide separation layer 16, and folding the complex including the support 14 and the carbon dioxide separation layer 16 in two, so as to sandwich the flow channel material 18, may be used as the layered body 20. In the latter case, each of the two surfaces of the flow channel material 18 contacts the carbon dioxide separation layer 16, and thus, the arithmetical surface roughness for each of the two surfaces should be 35 μm or less.

Since the carbon dioxide separation module 10 obtained as described above uses the flow channel material 18 according to the invention, excellent carbon dioxide separation efficiency is exhibited, due to the generation of effective turbulent flow by the existence of the thread intersection portion 22 and sufficient gas permeability, and further, undesired damage of the carbon dioxide separation layer 16 during manufacture is suppressed. Thus, a carbon dioxide separation module exhibiting excellent carbon dioxide separation efficiency can be obtained with high productivity.

EXAMPLES

Hereinafter, the present invention is specifically described with reference to examples. The material, the amount of use, the ratios, the processing details, the processing order, and the like described in the following examples can be changed as appropriate, as long as not departing from the spirit of the invention. Accordingly, it should be understand that the scope of the invention is not to be limited to the specific examples described below.

Unless otherwise specifically stated, the "%" and "parts" described below denote "% by mass" and "parts by mass", respectively.

Examples 1 to 3, and Comparative Example 1

<Production of Flow Channel Material>

Threads made of polypropylene (monofilament; thread diameter of 280 μm) were superposed over each other as the warp and weft, and the thread intersection portions were fused, to obtain a flow channel material precursor having a network structure. By subjecting the flow channel material precursor that had been prepared to thermal calendering (the conditions of a line pressure of 2 MPa and a temperature of the thermal calendering roll of 70° C. with respect to the flow channel material precursor having a width of 100 cm are taken as the standard, and the line pressure, the temperature of the thermal calendering roll, and the frequency of thermal calendering were each set to the value according to the conditions described in Table 1), the arithmetical mean surface roughness of at least one surface was adjusted to the value shown in the Table 1 below. In this way, mesh-like flow channel materials of Example 1 to 3, each of which serves as a polypropylene net, were prepared. Comparative Example 1 is a substance that has not been subjected to thermal calendering. Measurement of the arithmetical mean surface roughness was carried out by the method described above.

The network structure of the flow channel material in the exemplary embodiment of the invention was a network structure, in which the void area was 15 $mm^2$ and the sum of the angles formed by the direction of flow of the acidic gas to be separated and the threads, with the thread intersection portion as the basic point, was 90°.

Further, the layer film thickness ("b") of the flow channel material was measured by the method described above, and the relationship between the layer film thickness and the mean thread diameter "a" is shown in Table 1.

<Preparation of Coating Liquid Composition for Carbon Dioxide Separation Layer>

To an aqueous solution containing 2.4% of a polyvinyl alcohol-polyacrylic acid copolymer KURASTMER AP-20 (trade name, manufactured by Kuraray Co., Ltd.) and 0.01% of a 25% aqueous solution of glutaraldehyde (manufactured by Wako Pure Chemical Industries, Ltd.), 1 M hydrochloric acid was added until the pH reached 1. After completion of thickening reaction, a 40% aqueous solution of cesium carbonate (manufactured by Kisan Kinzoku Chemicals Co, Ltd.), which serves as a carrier, was added thereto such that the concentration of cesium carbonate was 6.0%. Further, 1% RAPISOL A-90 (trade name, manufactured by NOF Corporation) was added thereto, such that the concentration thereof was 0.003%. After elevating the temperature, an aqueous solution of agar, which had been separately prepared, was added thereto. Then, degassing was performed, to obtain a coating liquid composition (1) for forming a carbon dioxide separation layer.

<Formation of Carbon Dioxide Separation Layer>

On the surface of a supported PTFE (trade name: TET-RATEX 7008, manufactured by Nakao-Filter Co., Ltd.; 200 μm in thickness, maximum pore diameter of 0.1 μm), which serves as the porous support 14, the coating liquid composition (1) for forming a carbon dioxide separation layer obtained as described above was coated using a roll coater, followed by cooling at 4° C., and drying was performed while allowing the resulting coated membrane to pass through the drying zone in which the temperature was maintained at 60° C., to obtain a complex (1) equipped with a carbon dioxide separation layer 16 on the surface of the support 14. The velocity of coating was 10 m/min, and the drying temperature (the temperature of hot air in the drying zone) was set at 60° C.

<Preparation of Spiral-Wound Module for Carbon Dioxide Separation>

The flow channel material 18 obtained as described above was superposed onto the surface of the thus obtained complex (1) for carbon dioxide separation on the carbon dioxide separation layer 16 side (in Examples 1 to 3, the surface that had been surface-smoothed by performing thermal calendering), to prepare a layered body 20. This layered body 20 was multilayeredly wound around the perforated hollow central tube 12.

In this way, carbon dioxide separation modules of Examples 1 to 3 and Comparative Example 1 were prepared.

<Evaluation of Spiral-Wound Module for Carbon Dioxide Separation>

With regard to the thus obtained spiral-wound modules for carbon dioxide separation of Examples and Comparative Example, the following evaluation was performed. The results are shown in the following Table 1.

1. Module Manufacturing Yield

Evaluation of module defects was performed. The probability of having no defects in the module is designated as the module manufacturing yield. Production of the module was conducted five times or more. Evaluation of module defects was performed as follows. Namely, the supply side of the module thus prepared was filled with He gas and sealed, and evaluation was performed by measuring the time needed to allow the pressure to decrease from 0.34 MPa to 0.3 MPa. The module in which the time was 10,000 seconds or more was evaluated as "no defects".

2. Pressure Loss Test

The flow channel material having a network structure was set in a parallel-plate cell (a flow channel width of 10 cm and a flow channel length of 10 cm), and the pressure loss when air was made to flow at a flow rate of 10 L/min was measured.

3. Evaluation on Gas Separation

Regarding the performance of separation of gas using the thus prepared carbon dioxide separation modules according to the respective Examples and Comparative Example, evaluation was performed under the following conditions.

As the test gas, a source gas of $H_2:CO_2:H_2O=45:5:50$ (flow rate of 2.2 L/min) was supplied at a temperature of 130° C., and a total pressure of 301.3 kPa, to each of the carbon dioxide separation modules, and Ar gas (flow rate of 0.6 L/min) was made to flow on the permeation side. The gas that had permeated was analyzed by gas chromatography, and the $CO_2$ permeation speed ($P(CO_2)$) was calculated. Note that, GPU in the table represents gas permeation unit, unit: $1\times10^{-6}$ cm$^3$ (STP)/cm$^2$·S·cmHg.

4. Method of Accelerated Life Test of Module Life

The module life was measured under accelerated life test conditions. Measurement of module life was carried out under accelerated test conditions (150° C., 3 MPa, and 90% RH), and the point in time when the permeation coefficient ratio of carbon dioxide and hydrogen was decreased by 30 percent was determined as the life. When the test is performed under the same conditions, it is expected that, with the test for 10 days, a life of about one year is maintained under the usage conditions of lower temperature, lower pressure, and lower humidity.

TABLE 1

|  |  | Exp-1 | Exp-2 | Exp-3 | C. Exp-1 |
|---|---|---|---|---|---|
| T.H.R.T.C. | ° C. | 70 | 60 | 50 | — |
| Pressure at Thermal Calendering | MPa | 2 | 2 | 2 | — |
| Frequency of Thermal Calendering | Times | 4 | 2 | 1 | — |
| Arithmetical Mean Surface Roughness | μm | 12.8 | 25.5 | 34.2 | 45.1 |
| Void Area | mm$^2$ | 15 | 15 | 15 | 15 |
| Intersection Angle between Threads | (°) | 90 | 90 | 90 | 90 |
| b/a |  | 1.96 | 1.96 | 1.98 | 2.06 |
| P(CO$_2$) | GPU | 35 | 33 | 32 | — |
| Module Manufacturing Yield | % | 60 | 60 | 20 | 0 |
| Module Life | day | ≥10 | ≥10 | 1 | — |

In Table 1, the abbreviation "Exp" denotes "Example Number", the abbreviation "C.Exp" denotes "Comparative Example Number", and the abbreviation "T.H.R.T.C." denotes "Temperature of Heat Roll for Thermal Calendering".

As shown in Table 1, it is understood that the spiral-wound modules for carbon dioxide separation according to the invention were produced with high productivity, and had a long module life, excellent durability, and favorable carbon dioxide separation efficiency, as compared with Comparative Example 1 in which the surface roughness was not controlled.

Examples 4 to 7

<Production of Flow Channel Material>

Production of flow channel materials for Examples 4 to 7 was conducted in a manner substantially similar to that in Examples 1 to 3, except that, in the flow channel material having a network structure in Example 1, the flow channel material being obtained by superposing threads made of polypropylene (monofilament; thread diameter of 280 μm) over each other, as the warp and weft, and fusing the thread intersection portions, the conditions of superposing the threads were changed, thereby adjusting the void ratio of the network structure as described in Table 2, to prepare a network structure (having square voids) in which the sum of the angles formed by the direction of flow of the acidic gas to be separated and the threads, with the thread intersection portion as the basic point, was 90°. The arithmetical mean surface roughness for the surface contacting the carbon dioxide separation layer is shown in Table 2.

According to the method described above, the layer film thickness ("b") of the flow channel material was measured. The relationship between the layer film thickness and the mean thread diameter "a" is shown in Table 2.

<Preparation of Coating Liquid Composition for Carbon Dioxide Separation Layer>

Water was added to a polyvinyl alcohol-polyacrylic acid copolymer (trade name: KURASTMER AP-20, manufactured by Kuraray Co., Ltd.), which was being stirred. Subsequently, an aqueous solution of cesium carbonate (solids concentration: 40% by mass) was added thereto, and the mixture was thoroughly stirred using a magnetic stirrer, under the condition of a temperature of 25° C., to prepare an aqueous solution having a concentration of polyvinyl alcohol-polyacrylic acid copolymer, which serves as a water-soluble polymer, of 3.0% by mass, and a concentration of cesium carbonate, which serves as a carbon dioxide carrier, of 6.0% by mass (the mass ratio of 1:2). Then, degassing was performed, to obtain a coating liquid composition (2) for forming a carbon dioxide separation layer.

<Formation of Carbon Dioxide Separation Layer>

On the surface of a supported PTFE (trade name: TETRATEX 7008, manufactured by Nakao-Filter Co., Ltd.; 200 µm in thickness, maximum pore diameter of 0.1 µm), which serves as the porous support 14, the coating liquid composition (2) for forming a carbon dioxide separation layer obtained as described above was coated using a roll coater, followed by drying while allowing the resulting coated membrane to pass through the drying zone in which the temperature was maintained at 60° C., to obtain a complex (2) equipped with a carbon dioxide separation layer 16 on the surface of the support 14. The velocity of coating was 10 m/min, and the drying temperature (the temperature of hot air in the drying zone) was set at 60° C.

<Preparation of Spiral-Wound Module for Carbon Dioxide Separation>

The flow channel material 18 obtained as described above was superposed onto the surface of the thus obtained complex (2) for carbon dioxide separation on the carbon dioxide separation layer 16 side (in Examples 4 to 7, the surface that had been surface-smoothed by performing thermal calendering), to prepare a layered body 20. This layered body 20 was multilayeredly wound around the perforated hollow central tube 12.

In this way, carbon dioxide separation modules of Examples 4 to 7 were prepared.

<Evaluation of Spiral-Wound Module for Carbon Dioxide Separation>

With regard to the thus obtained spiral-wound modules for carbon dioxide separation of Examples 4 to 7, evaluation was performed in a manner substantially similar to that in Examples 1 to 3. The results are shown in the following Table 2.

TABLE 2

|  |  | Exp-4 | Exp-5 | Exp-6 | Exp-7 |
|---|---|---|---|---|---|
| T.H.R.T.C. | ° C. | 65 | 65 | 65 | 65 |
| Pressure at Thermal Calendering | MPa | 2 | 2 | 2 | 2 |
| Frequency of Thermal Calendering | Times | 3 | 3 | 3 | 3 |
| Arithmetical Mean Surface Roughness | µm | 21 | 23 | 22 | 22 |
| Void Area | mm$^2$ | 8 | 12 | 15 | 20 |
| Intersection Angle between Threads | (°) | 90 | 90 | 90 | 90 |
| b/a |  | 1.96 | 1.97 | 1.96 | 1.97 |
| Pressure Loss | kPa | 6.5 | 24 | 28 | 93 |
| P(CO$_2$) | GPU | 38 | 38 | 38 | 38 |
| Module Manufacturing Yield | % | 80 | 60 | 60 | 20 |

In Table 1, the abbreviation "Exp" denotes "Example Number", and the abbreviation "T.H.R.T.C." denotes "Temperature of Heat Roll for Thermal Calendering".

As shown in Table 2, it is understood that the spiral-wound modules for carbon dioxide separation according to the invention exhibited sufficiently small pressure loss in terms of practical use, and were produced with high productivity. Further, it is understood that, when the void area was 15 mm$^2$ or less, the production yield was further improved and the pressure loss was further reduced.

Examples 8 to 11

<Production of Flow Channel Material>

Production of flow channel materials for Examples 8 to 11 was conducted in a manner substantially similar to that in Example 4, except that, in the flow channel material having a network structure in Example 4, the flow channel material being obtained by superposing threads made of polypropylene (monofilament; thread diameter of 280 µm) over each other, and fusing the thread intersection portions, the conditions of weaving the threads were changed to adjust the network structure, thereby preparing a network structure in which the sum of the angles formed by the direction of flow of the acidic gas to be separated and the threads, with the thread intersection portion as the basic point, was the angle described in Table 3. In this process, the diameter of the thread used and the thermal calendering conditions were adjusted such that the arithmetical mean surface roughness for the surface contacting the carbon dioxide separation layer was 25 µm or less in terms of arithmetical mean roughness, and b/a<2.0.

TABLE 3

|  |  | Exp-8 | Exp-9 | Exp-10 | Exp-11 |
|---|---|---|---|---|---|
| T.H.R.T.C. | ° C. | 65 | 65 | 65 | 65 |
| Pressure at Thermal Calendering | MPa | 2 | 2 | 2 | 2 |
| Frequency of Thermal Calendering | Times | 3 | 3 | 3 | 3 |
| Arithmetical Mean Surface Roughness | µm | 25> | 25> | 25> | 25> |
| Intersection Angle between Threads | (°) | 120 | 101 | 88 | 60 |
| P(CO$_2$) | GPU | 40 | 39 | 38 | 25 |

In Table 1, the abbreviation "Exp" denotes "Example Number", and the abbreviation "T.H.R.T.C." denotes "Temperature of Heat Roll for Thermal Calendering".

As shown in Table 3, it is understood that the spiral-wound modules for carbon dioxide separation according to the invention exhibited more favorable carbon dioxide separation efficiency, when the intersection angle in the thread intersection portion was adjusted to 100° or more.

The carbon dioxide separation module and manufacturing method according to the present invention are not limited to the above-described exemplary embodiments, and various configurations can naturally be adopted without departing from the gist of the invention.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

Japanese Patent Application No. 2012-218166 filed Sep. 28, 2012, is hereby expressly incorporated by reference, in its entirety, into the present application. All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An acidic gas separation module, comprising:
a perforated hollow central tube; and
a layered body that is wound on the perforated hollow central tube and has, in the following order on a porous support:
an acidic gas separation layer containing a water-absorbing polymer, a carrier, and water; and
a flow channel material with a network structure having a thread intersection portion and an arithmetical surface roughness for a surface contacting the acidic gas separation layer in the thread intersection portion of 35 µm or less.

2. The acidic gas separation module according to claim 1, satisfying a relationship shown in the following Formula (1):

$$b < 2a \quad \text{Formula (1)}$$

wherein, in Formula (1), "a" represents a mean diameter of a thread in a region other than the thread intersection portion in the flow channel material, and "b" represents a layer film thickness of the flow channel material.

3. The acidic gas separation module according to claim 1, wherein a void area formed by the network structure of the flow channel material is in a range of from 0.5 mm² to 20 mm².

4. The acidic gas separation module according to claim 1, wherein, in the network structure of the flow channel material, the sum of angles formed by a direction of flow of the acidic gas to be separated and threads, with the thread intersection portion as a reference point, is 85° or more.

5. The acidic gas separation module according to claim 2, wherein a void area formed by the network structure of the flow channel material is in a range of from 0.5 mm² to 20 mm², and, in the network structure of the flow channel material, the sum of angles formed by a direction of flow of the acidic gas to be separated and threads, with the thread intersection portion as a reference point, is 85° or more.

6. The acidic gas separation module according to claim 1, wherein the network structure of the flow channel material is formed with a thread comprising at least one resin selected from the group consisting of polyester, polypropylene, polyamide, polyphenylene sulfide, polytetrafluoroethylene, polyether ether ketone and polyvinylidene chloride.

7. The acidic gas separation module according to claim 1, wherein the carrier is at least one carbon dioxide carrier selected from the group consisting of cesium carbonate, cesium hydrogencarbonate, cesium hydroxide, rubidium carbonate, rubidium hydrogencarbonate and rubidium hydroxide.

8. The acidic gas separation module according to claim 5, wherein the network structure of the flow channel material is formed with a thread comprising at least one resin selected from the group consisting of polyester, polypropylene, polyamide, polyphenylene sulfide, polytetrafluoroethylene, polyether ether ketone and polyvinylidene chloride, and the carrier is at least one carbon dioxide carrier selected from the group consisting of cesium carbonate, cesium hydrogencarbonate, cesium hydroxide, rubidium carbonate, rubidium hydrogencarbonate and rubidium hydroxide.

9. The acidic gas separation module according to claim 1, wherein a material for the porous support is at least one resin material selected from the group consisting of polyethylene, polystyrene, polyethylene terephthalate, polytetrafluoroethylene, polyether sulfone, polyphenylene sulfide, polysulfone, polypropylene, polyether imide, polyether ether ketone and polyvinylidene fluoride.

10. The acidic gas separation module according to claim 1, wherein the water-absorbing polymer is at least one selected from the group consisting of a polyvinyl alcohol-polyacrylic acid copolymer, polyvinyl alcohol, polyacrylic acid, polyacrylic acid salts, polyvinyl butyral, poly-N-vinyl pyrrolidone, poly-N-vinyl acetamide and polyacrylamide.

11. The acidic gas separation module according to claim 8, wherein a material for the porous support is at least one resin material selected from the group consisting of polyethylene, polystyrene, polyethylene terephthalate, polytetrafluoroethylene, polyether sulfone, polyphenylene sulfide, polysulfone, polypropylene, polyether imide, polyether ether ketone and polyvinylidene fluoride, and the water-absorbing polymer is at least one selected from the group consisting of a polyvinyl alcohol-polyacrylic acid copolymer, polyvinyl alcohol, polyacrylic acid, polyacrylic acid salts, polyvinyl butyral, poly-N-vinyl pyrrolidone, poly-N-vinyl acetamide and polyacrylamide.

12. The acidic gas separation module according to claim 1, wherein the acidic gas separation layer further comprises a thickening polysaccharide.

13. The acidic gas separation module according to claim 1, wherein the water-absorbing polymer comprises a crosslinked structure based on a crosslinking agent.

14. The acidic gas separation module according to claim 11, wherein the acidic gas separation layer further comprises a thickening polysaccharide, and the water-absorbing polymer comprises a crosslinked structure based on a crosslinking agent.

15. The acidic gas separation module according to claim 13, wherein the crosslinking agent is at least one selected from the group consisting of a polyvalent glycidyl ether, a polyhydric alcohol, a polyvalent isocyanate, a polyvalent aziridine, a haloepoxy compound, a polyvalent aldehyde and a polyvalent amine.

16. The acidic gas separation module according to claim 14, wherein the crosslinking agent is at least one selected from the group consisting of a polyvalent glycidyl ether, a polyhydric alcohol, a polyvalent isocyanate, a polyvalent aziridine, a haloepoxy compound, a polyvalent aldehyde and a polyvalent amine.

17. The acidic gas separation module according to claim 1, wherein the acidic gas separation layer further comprises at least one carbon dioxide absorption accelerator selected from the group consisting of nitrogen-containing compounds and sulfur compounds.

18. The acidic gas separation module according to claim 16, wherein the acidic gas separation layer further comprises at least one carbon dioxide absorption accelerator selected from the group consisting of nitrogen-containing compounds and sulfur compounds.

19. A method for manufacturing an acidic gas separation module, the method comprising:
   forming an acidic gas separation complex comprising a porous support and an acidic gas separation layer by forming an acidic gas separation layer containing a water-absorbing polymer, a carrier, and water on the porous support; and
   winding, around a perforated hollow central tube, a layered body comprising:
      the porous support;
      the acidic gas separation layer; and
      a flow channel material, which has a network structure having a thread intersection portion and an arithmetical surface roughness of a surface contacting the acidic gas separation layer in the thread intersection portion of 35 µm or less, the layered body being formed by disposing the flow channel material at a surface at a side of the acidic gas separation layer of the acidic gas separation complex.

20. The method for manufacturing an acidic gas separation module according to claim 19, further comprising:
   obtaining the flow channel material with a network shape using a thread comprising at least one resin selected from the group consisting of polyester, polypropylene, polyamide, polyphenylene sulfide, polytetrafluoroethylene, polyether ether ketone and polyvinylidene fluoride; and
   performing thermal calendering on the obtained flow channel material to impart an arithmetical surface roughness of 35 µm or less at a surface contacting the acidic gas separation layer.

* * * * *